United States Patent
Katayama

[11] Patent Number: 6,061,383
[45] Date of Patent: May 9, 2000

[54] METHOD AND APPARATUS FOR TUNING POLYCHLORINATED BIPHENYL TO HARMLESS

[75] Inventor: Hideo Katayama, Tokyo, Japan

[73] Assignee: Setsu Anzai, Tokyo, Japan

[21] Appl. No.: 09/373,602

[22] Filed: Aug. 13, 1999

[30] Foreign Application Priority Data

Jul. 26, 1999 [JP] Japan .................................. 11-210572

[51] Int. Cl.[7] ................................................ H05B 11/00
[52] U.S. Cl. ..................................... 373/5; 373/8; 208/13; 588/201
[58] Field of Search .................................. 373/1, 3, 5, 8, 373/109, 110; 588/201, 207, 209; 110/346; 208/13

[56] References Cited

U.S. PATENT DOCUMENTS

| | | | |
|---|---|---|---|
| 4,144,162 | 3/1979 | Edgar et al. .............................. | 208/13 |
| 5,301,620 | 4/1994 | Nagel et al. .............................. | 110/346 |
| 5,387,734 | 2/1995 | Hagenmaier et al. ................... | 588/207 |
| 5,602,297 | 2/1997 | Wang ....................................... | 588/207 |
| 5,640,709 | 6/1997 | Nagel et al. ............................. | 588/201 |
| 5,678,244 | 10/1997 | Shaw et al. ............................. | 588/201 |

*Primary Examiner*—Tu Ba Hoang
*Attorney, Agent, or Firm*—Armstrong, Westerman, Hattori, McLeland & Naughton

[57] ABSTRACT

The present invention reduces generation of harmful substances through processing at lower cost for facilities and processing. According to the present invention, polychlorinated biphenyl and mixture of alumina oxide and silicon dioxide are mixed and emulsified in an ultrasonic emulsifier 2. The emulsified mixture is then charged into an electric resistance type melting furnace 5 and is melted at temperature of 1500° C.–2000° C. and is turned to glassy state.

2 Claims, 2 Drawing Sheets

METHOD AND APPARATUS FOR TUNING POLYCHLORINATED BIPHENYL TO HARMLESS

BACKGROUND OF THE INVENTION

The present invention relates to a method and an apparatus for turning polychlorinated biphenyl (PCB) to harmless. The term PCB used in the present invention is defined as PCB alone or a liquid such as oil, solvent, etc. which contains PCB.

Polychlorinated biphenyl (PCB) is physically and chemically stable and has high heat-resistant and electric insulating property. In this respect, it has been widely used as a product for industrial applications such as insulating oil for electrical equipment and devices, heat medium, lubricant, ink, etc. either by itself alone or by mixing with mineral oil or insulating oil. However, it has been recently discovered that these substances containing PCB are harmful to human being and are environment-polluting and difficult to decompose in the nature, and the production of PCB was stopped. As a result, PCB-containing substances already used have been collected to avoid the possibility of risk and pollution, and PCB-containing products should be kept in storage and processed in order to make them harmless. In the past, efforts for research and development have been made to process PCB and to turn it to harmless substance by methods such as chemical processing, processing by high temperature combustion, processing using metal sodium, etc. All of these processing methods have problems such as high cost for facilities and processing, difficulty in processing of toxic gas, etc. None of these methods is used yet for practical application in the whole world, and waste materials containing PCB are stored in containers and kept in storage without being processed at present.

For example, it is proposed in JP-A-7-241352 that PCB is charged into a melting furnace used for metal refining and kept at temperature of 1100° C. or higher and PCB is thermally decomposed. However, PCB is chemically stable and incombustible, and if it is forcibly decomposed by heating, highly toxic harmful substances of chlorine type or sulfide type are generated. This results in vast amount of cost for waste gas processing Thus, it is practically impossible to process PCB by high temperature combustion method.

To solve the above problems, it is an object of the present invention to provide a method and an apparatus for turning polychlorinated biphenyl to harmless in order to process it at lower cost for facilities and processing and to reduce generation of harmful substances to practically harmless level.

To attain the above object, the method for turning polychlorinated biphenyl to harmless according to the present invention comprises the steps of mixing and emulsifying a polychlorinated biphenyl solution with alumina oxide and silicon dioxide in an ultrasonic emulsifier, charging the emulsified emulsion mixture into an electric resistance type melting furnace, and melting at temperature of 1500° C.–2000° C. and processing to glassy state. The present inventors have found through experiments that the mixture of polychlorinated biphenyl solution and alumina oxide and silicon dioxide are emulsified using ultrasonic energy and can be turned to a type of clay-like substance, and also found that this can be accomplished by melting the mixture in an electric resistance type melting furnace.

Also, the apparatus for turning polychlorinated biphenyl to harmless according to the present invention comprises a storage tank 1 for polychlorinated biphenyl solution connected to an ultrasonic emulsifier 2, a storage tank 4 for alumina oxide and silicon dioxide connected to the ultrasonic emulsifier via a rotary kiln 3, an electric resistance type melting furnace 5 connected to the ultrasonic emulsifier via a monitor unit 8 and an electric resistance measuring unit 9, a feedback piping 22 for feeding back the emulsified mixture obtained from the ultrasonic emulsifier to the ultrasonic emulsifier, and an automatic control unit 10 for measuring emulsified state of the emulsion mixture by said electric resistance measuring unit and for feeding back the incompletely emulsified mixture to the ultrasonic emulsifier via the feedback piping. The reference numerals used for the components in the above arrangement are used simply to provide convenience when referring to the drawings and to facilitate the understanding of the present invention, and the spirit and the scope of the present invention are not limited in any way by these reference numerals.

BRIEF DESCRIPTION OF THE DRAWINGS

FIG. 2 represents an example of an electric resistance type melting furnace used in the present invention.

DETAILED DESCRIPTION OF THE PREFERRED EMBODIMENT

Figure 1:
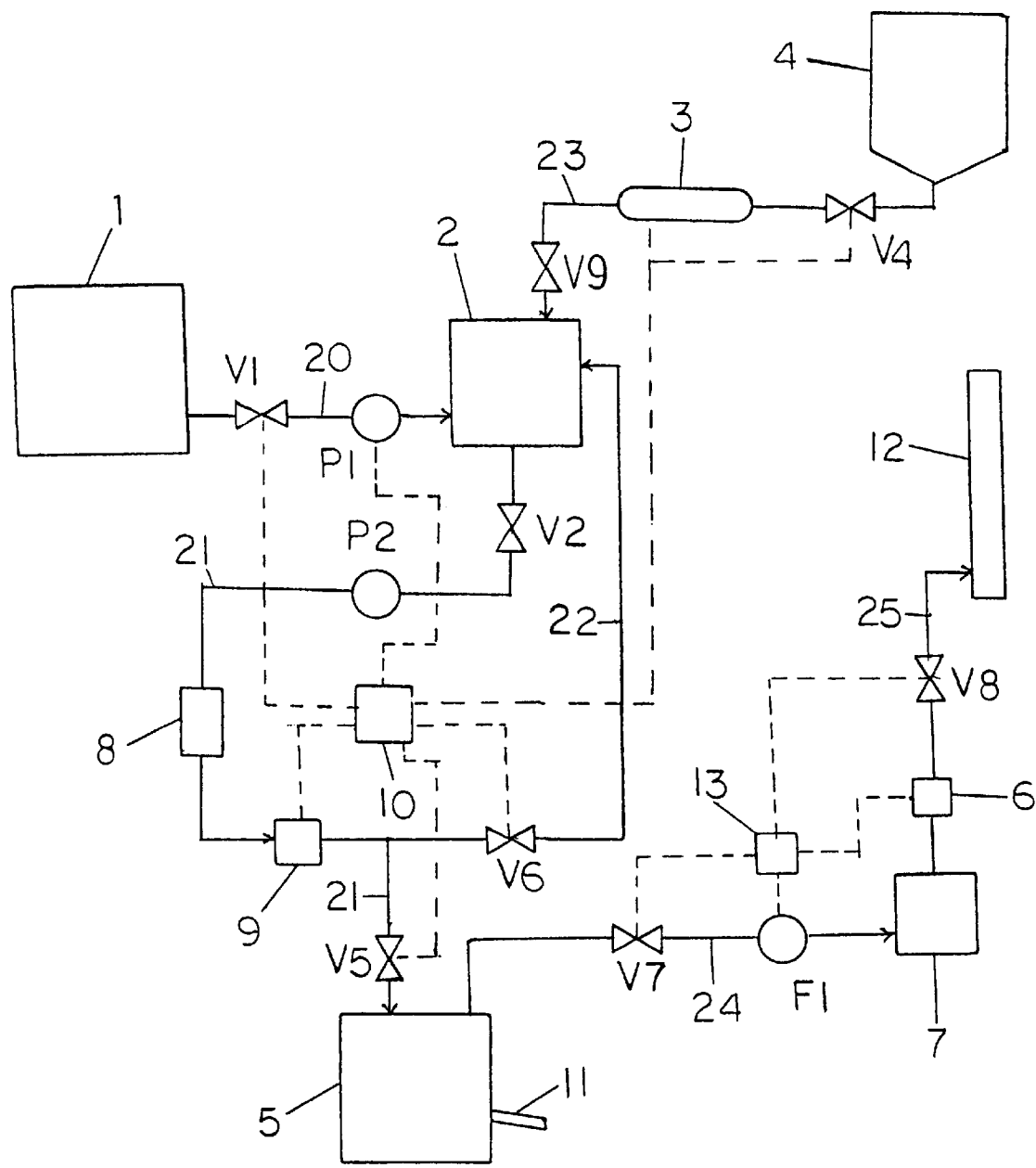
FIG. 1 is a block diagram of an embodiment of an apparatus for turning polychlorinated biphenyl to harmless according to the present invention.

In the following, description will be given on an embodiment of the present invention referring to the attached drawings. FIG. 1 is a block diagram of an embodiment of an apparatus for turning polychlorinated biphenyl to harmless according to the present invention.

A storage tank 1 containing polychlorinated biphenyl solution is connected to an ultrasonic emulsifier 2 via an electromagnetic valve V1, a piping 20, and a pump P1. A storage tank 4 containing mixture of alumina oxide and silicon dioxide is connected to the ultrasonic emulsifier 2 via an electromagnetic valve V4, a rotary kiln 3, a piping 23, and an electromagnetic valve V9.

In the ultrasonic emulsifier 2, polychlorinated biphenyl solution and mixture of alumina and silicon dioxide are emulsified and mixed using ultrasonic energy. The emulsified mixture is then sent to an electric resistance type melting furnace 5 via an electromagnetic valve V2, a pump P2, a piping 21, a monitor unit 8, an electric resistance measuring unit 9, and an electromagnetic valve V5. In the electric resistance type melting furnace 5, the mixture is melted at melting temperature of 1500° C.–2000° C. and is turned to glassy molten state. This glassy molten material is then discharged out of the electric resistance type melting furnace 5 through a discharge unit 11. When the glassy material in molten state is hardened, polychlorinated biphenyl is turned to glassy material containing alumina and silicon dioxide.

The monitor unit 8 connected to the piping 21 has a glass window, and it is possible to watch the emulsified state of the mixture of polychlorinated biphenyl and alumina and silicon dioxide emulsified and mixed by the ultrasonic emulsifier 2. Electric resistance value of the emulsified mixture is measured at the electric resistance measuring unit 9, and a signal is sent to an automatic control unit 10. When the resistance value is high (i.e. degree of emulsification is low), the electromagnetic valve V5 mounted on the piping 21 is closed by the automatic control unit 10 so that incompletely emulsified material is not sent to the electric resistance type melting furnace 5. At the same time, the electromagnetic valve V6 is opened and the incompletely emulsified mixture is sent back to the ultrasonic emulsifier 2 via a feedback piping 22 using the pump P2. In this case, the pump P1 is stopped, and the electromagnetic valves V1 and V4 are closed. Rotation of the rotary kiln 3 is also stopped. Next, after a certain time has elapsed and when resistance value of the emulsified mixture is turned to a prescribed value as determined by the electric resistance measuring unit 9, the closed electromagnetic valves V1, V4, and V5 are opened. Then, the pump 1 and the rotary kiln 3 are rotated, and it is restored to normal operating condition.

Exhaust gas from the electric resistance type melting furnace 5 is sent to an exhaust gas chamber 7 by using an exhaust fan F1 mounted on an exhaust pipe 24. Then, using an exhaust gas processing filter and a catalyst in the exhaust gas chamber 7, it is converted to non-polluting exhaust gas, and it is discharged to outside through a chimney 12. A sensor group 6 installed on the exhaust pipe 25 is used to detect harmful gas components contained in the exhaust gas from the exhaust gas chamber 7. If the detected value is higher than the standard value, the automatic control unit 13 is operated, and the fan F1 is stopped. Then, electromagnetic valves V7 and V8 are closed, and discharge of the exhaust gas in the exhaust gas chamber 7 is stopped. The exhaust gas is retained in the exhaust gas chamber 7 for a certain period of time. It is then turned to harmless gas using the exhaust gas processing filter and the catalyst. When the value detected by the sensor group 6 is turned to lower than the standard value, the electromagnetic valves V7 and V8 are opened by the automatic control unit 13. Then, the exhaust fan F1 is operated, and the exhaust gas is discharged in usual manner.

Figure 2A:
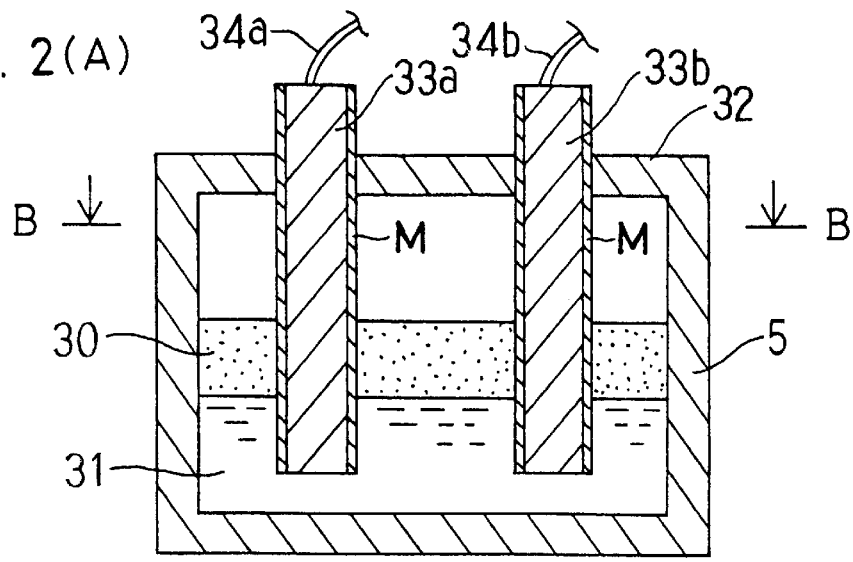
FIG. 2(A) is a longitudinal sectional view of the melting furnace.
Figure 2B:
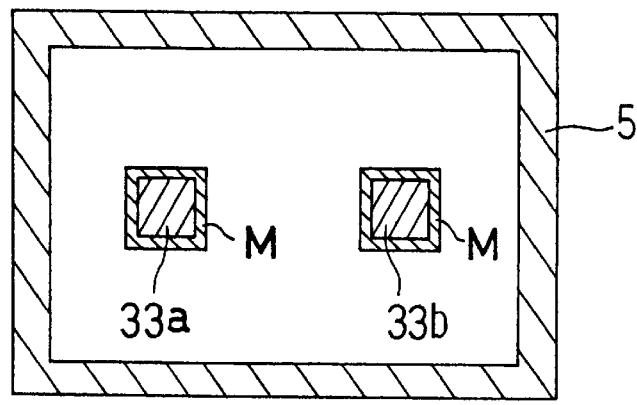
FIG. 2(B) is a cross-sectional view of the furnace along the line B—B in FIG. 2(A)
Figure 2C:
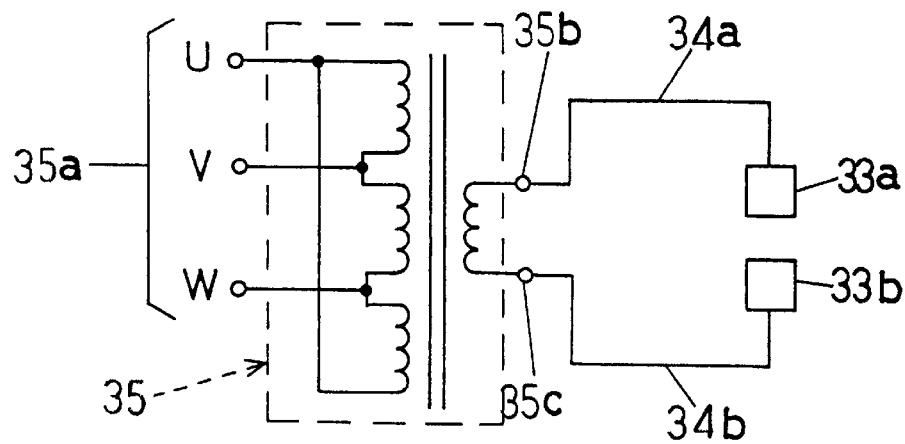
FIG. 2(C) is an electrical circuit diagram.

FIG. 2 shows an example of an electric resistance type melting furnace 5. FIG. 2(A) is a longitudinal sectional view of the melting furnace, FIG. 2(B) is a cross-sectional view of the furnace along the line B—B in FIG. 2(A), and FIG. 2(C) is an electrical circuit diagram.

In FIG. 2(A) and FIG. 2(B), a metal melt 31 positioned under the emulsified mixture 30 is produced by melting of metal waste before the melting of the emulsified mixture 30, and the emulsified mixture 30 is deposited on the upper surface of the metal melt 31. Two graphite electrodes 33a and 33b each having rectangular cross-section are penetrating a ceiling unit 32 and are movably arranged. Outer peripheral surface of each of the graphite electrodes 33a and 33b is coated with a molybdenum member M. Tip of each of the electrodes is buried into the metal melt 31, and the emulsified mixture 30 is charged onto the metal melt 31. To the graphite electrodes 33a and 33b, power feeding cables 34a and 34b are connected. As shown in FIG. 2(C), the power feeding cables 34a and 34b are connected to power feeding terminals 35b and 35c of secondary single phase of a power transformer 35. Connection terminals U, B and W of primary side 35a of the power transformer 35 are connected to a 3-phase power source. In this example, outer peripheral surfaces of the graphite electrodes are coated with molybdenum M. The strength of each electrode is structurally increased and it can be used up to the temperature of about 2600° C. As a result, even when the emulsified mixture of metal waste may hit the electrodes, the electrodes are rarely damaged, and this contributes to the reduction of the processing cost. The molten emulsified mixture 30 is turned to harmless glassy state and is discharged to outside. Harmful and harmless metal components charged into the melting furnace 5 are melted and are turned to alloy and are discharged to outside.

As it is evident from the above description, according to the present invention, polychlorinated biphenyl solution is mixed with alumina oxide and silicon dioxide in the ultrasonic emulsifier, and these are emulsified and mixed and are turned to a type of clay-like material, and this emulsified mixture is instantaneously melted under high temperature condition in the electric resistance type melting furnace. The emulsified mixture containing alumina oxide and silicon dioxide is turned to glassy state. Accordingly, only very small quantity of harmful gas is generated, and the content of harmful gas components in the exhaust gas is decreased to lower than the standard value by the filter, the catalyst, etc. in the exhaust gas chamber. Also, the glassy material is chemically stable and harmless, and it can be used the material in the applications such as road construction.

What is claimed is:

1. A method for turning polychlorinated biphenyl to harmless, comprising the steps of:

mixing and emulsifying a polychlorinated biphenyl solution with alumina oxide and silicon dioxide in an ultrasonic emulsifier, charging the emulsified emulsion mixture into an electric resistance type melting furnace, and melting at temperature of 1500° C.–2000° C. and processing to glassy state.

2. An apparatus for turning polychlorinated biphenyl to harmless, comprising a storage tank for polychlorinated biphenyl connected to an ultrasonic emulsifier, a storage tank for alumina oxide and silicon dioxide connected to the ultrasonic emulsifier via a rotary kiln, an electric resistance type melting furnace connected to the ultrasonic emulsifier via a monitor unit and an electric resistance measuring unit, a feedback piping for feeding back the emulsified mixture obtained from the ultrasonic emulsifier to the ultrasonic emulsifier, and an automatic control unit for measuring emulsified state of the emulsified mixture by said electric resistance measuring unit and for feeding back incompletely emulsified mixture to the ultrasonic emulsifier through the feedback piping.

* * * * *